(12) United States Patent
Johnston

(10) Patent No.: US 10,542,477 B2
(45) Date of Patent: Jan. 21, 2020

(54) MULTI-HOP NETWORKING PROTOCOL FOR WIDE-AREA ENERGY HARVESTING SENSOR NETWORK DEPLOYMENTS

(71) Applicant: The Boeing Company, Chicago, IL (US)

(72) Inventor: Matthew R. Johnston, Redondo Beach, CA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 15/379,144

(22) Filed: Dec. 14, 2016

(65) Prior Publication Data

US 2018/0167864 A1 Jun. 14, 2018

(51) Int. Cl.
| | | |
|---|---|---|
| *H04W 40/22* | (2009.01) | |
| *H04W 40/24* | (2009.01) | |
| *H04W 4/00* | (2018.01) | |
| *H04L 29/08* | (2006.01) | |
| *H04W 4/70* | (2018.01) | |
| *H04W 52/02* | (2009.01) | |
| *H04W 80/02* | (2009.01) | |
| *H04W 4/38* | (2018.01) | |

(52) U.S. Cl.
CPC .......... *H04W 40/22* (2013.01); *H04W 4/70* (2018.02); *H04W 40/244* (2013.01); *H04W 52/0251* (2013.01); *H04L 67/12* (2013.01); *H04W 4/38* (2018.02); *H04W 80/02* (2013.01); *Y02D 70/00* (2018.01); *Y02D 70/144* (2018.01); *Y02D 70/22* (2018.01)

(58) Field of Classification Search
None
See application file for complete search history.

(56) References Cited

U.S. PATENT DOCUMENTS 9,656,621 B2 * 5/2017 Curtis ................. G08B 21/182
9,846,479 B1 * 12/2017 Brown ................. G06F 1/3296
(Continued)

FOREIGN PATENT DOCUMENTS

CN 104219735 12/2014

OTHER PUBLICATIONS

Kansai et al.; "Power Management in Energy Harvesting Sensor Networks"; ACM Transactions on Embedded Computing Systems (TECS); vol. 6 No. 4; 2007; p. 32.
(Continued)

*Primary Examiner* — Steve R Young
(74) *Attorney, Agent, or Firm* — Gates & Cooper LLP

(57) ABSTRACT

The present invention provides an EHSN communication protocol that uses a beaconing scheme to facilitate communication between multiple low power sensor nodes. In the illustrative embodiment, the desired sensor data flows through a series of sensor nodes from the origin sensor to a destination node through a set of intermediate relay nodes. Transmissions from one node to another occur using a receiver-initiated beaconing scheme, in which beacons are sent by each node when they have harvested sufficient energy to relay data. The specific set of relay nodes is chosen opportunistically from the total set of nodes in the network, based on which nodes have harvested sufficient energy (and broadcasted the appropriate beacon), and which nodes are optimally positioned to forward data to the destination node.

21 Claims, 3 Drawing Sheets

(56) References Cited

U.S. PATENT DOCUMENTS

| | | | | |
|---|---|---|---|---|
| 2007/0060141 | A1* | 3/2007 | Kangude | H04W 74/002 455/445 |
| 2012/0095622 | A1* | 4/2012 | Lynch | B64C 25/00 701/3 |
| 2013/0121176 | A1* | 5/2013 | Addepalli | H04L 67/12 370/252 |
| 2016/0014240 | A1* | 1/2016 | Ghaed | H04L 69/22 370/474 |
| 2017/0131173 | A1* | 5/2017 | Seddiq | G01M 3/2815 |

OTHER PUBLICATIONS

Li et al.; Distributed Opportunistic Scheduling for Energy Harvesting Based Wireless Networks: A Two-Stage Probing Approach; 2015.

Sharma et al.; "Optimal Energy Management Policies for Energy Harvesting Sensor Nodes"; Wireless Communications, IEEE Transactions; vol. 9 No. 4; 2010; p. 1326-1336.

Aprem et al.; "Transmit Power Control Policies for Energy Harvesting Sensors With Retransmissions"; Selected Topics in Signal Processing, IEEE Journal; vol. 7 No. 5; 2013; p. 895-906.

Devraj et al.; Power Allocation in Energy Harvesting Sensors With Arq: A Convex Optimization Approach; Signal and Information Processing (GlobalSIP) IEEE Global Conference; 2014; p. 208-212.

Extended European Search Report dated Apr. 26, 2018 for European Patent Application No. 17202440.8.

European Examination Report dated Apr. 26, 2019 for European Patent Application No. 17202440.8.

Sharma et al.; "Packet Drop Probability Analysis of Arq and Hard-CC With Energy Harvesting Transmitters and Receivers"; Signal and Information Processing (GlobalSIP); IEEE Global Conference; 2014; p. 148-152.

Li et al.; "Relay Scheduling for Cooperative Communications in Sensor Networks With Energy Harvesting"; Wireless Communications, IEEE Transactions; vol. 10 No. 9; 2011; p. 2918-2928.

Medepally et al.; "Voluntary Energy Harvesting Relays and Selection in Cooperative Wireless Networks"; Wireless Communications, IEEE Transactions; 2010; p. 3543-3553.

Seah et al.; Wireless Sensor Networks Powered by Ambient Energy Harvesting (wsnheap)—Survey and Challenges; Wireless Communication, Vehicular Technology, Information Theory and Aerospace & Electronic Systems Technology; $1^{st}$ Int'l Conf. Wireless VITAE; 2009; p. 1-5.

Iannello et al.; "Medium Access Control Protocols for Wireless Sensor Networks With Energy Harvesting"; Communications, IEEE Transactions; vol. 60 No. 5; 2012; p. 1381-1389.

Eu et al.; "Design and Performance Analysis of Mac Schemes for Wireless Sensor Networks Powered by Ambient Energy Harvesting"; Ad Hoc Networks; vol. 9 No. 3; 2011; p. 300-323.

Buettner et al.; "X-Mac: A Short Preamble Mac Protocol for Duty-Cycled Wireless Sensor Networks"; Proceedings of the $4^{th}$ Int'l Conf. On Embedded Networked Sensor Systems, ACM; 2006; p. 307-320.

Fafoutis et al.; "ODMAC: An On-Demand MAC Protocol for Energy Harvesting-Wireless Sensor Networks"; Conference: Proceedings of the 8th ACM Symposium on Performance Evaluation of wireless ad hoc, sensor, and ubiquitous networks; PE-WASUN 2011; Miami Beach, Florida, USA, Oct. 31-Nov. 4, 2011, pp. 49-56.

\* cited by examiner

MULTI-HOP NETWORKING PROTOCOL FOR WIDE-AREA ENERGY HARVESTING SENSOR NETWORK DEPLOYMENTS

TECHNICAL FIELD

The present disclosure relates generally to sensor networks, and more particularly to a multi-hop networking protocol for a network of energy harvesting sensors. Energy harvesting sensor networks (EHSNs) can be applied in many areas, including aircraft cabin systems, manufacturing facilities, and the like.

BACKGROUND

Low power sensors currently require batteries to function. Because the batteries require periodic replacement, the low power sensors are not ideal for wide distribution (e.g., thousands throughout an aircraft) or inaccessible locations (e.g., such as an aircraft engine), due to the cost of maintenance. Moreover, battery-powered sensor networks are inappropriate for some applications due to environmental concerns arising from the risk of battery leakage. Low power sensors with energy harvesting capabilities can be used instead of battery powered sensors, but data transmission from sensor-to-sensor may fail if one sensor in the data transmission chain lacks the power to continue the transmission, which occurs due to the unpredictable and random nature of energy sources. To avoid such data transmission failures an EHSN communication protocol is needed to facilitate the transmission of data between energy harvesting devices.

SUMMARY

In an illustrative embodiment, the present invention provides an EHSN communication protocol that uses a beaconing scheme to facilitate communication between multiple low power sensor nodes. In the illustrative embodiment, the desired sensor data flows through a series of sensor nodes from the origin sensor to a destination node through a set of intermediate relay nodes. Transmissions from one node to another occur using a receiver-initiated beaconing scheme, in which beacons are sent by each node when they have harvested sufficient energy to relay data. The specific set of relay nodes is chosen opportunistically from the total set of nodes in the network, based on which nodes have harvested sufficient energy (and broadcasted the appropriate beacon), and which nodes are optimally positioned to forward data to the destination node.

One embodiment of the present disclosure takes the form of an energy harvesting sensor network. The inventive network comprises a plurality of energy harvesting sensors operating as nodes, wherein each of the energy harvesting sensors is configured to operate in accordance with a predefined communication protocol. In addition, the network includes a server configured to wirelessly communicate with the energy harvesting sensors. The predefined communication protocol includes a RECEIVE state in which a node transmits a ready to receive (RTR) beacon indicating to other nodes that it is awake and has sufficient energy to receive and retransmit a data packet.

Another embodiment of the present disclosure takes the form of an energy harvesting node. The inventive node includes an energy harvesting device; an energy storage device; a microcontroller; and a wireless transceiver. The microcontroller and wireless transceiver are powered by the energy storage device. The microcontroller is configured to operate the energy harvesting node in accordance with a predefined communication protocol in which the transceiver transmits an RTR beacon indicating that the node is awake and has sufficient energy to receive a data packet from another node and to retransmit the data packet.

Another embodiment of the present disclosure takes the form of a method employed by each node in the energy harvesting sensor network. The inventive method includes the following steps. Nodes remain in a SLEEP state until a predetermined threshold of energy has been harvested. Upon harvesting the predetermined threshold of energy, a node enters a TRANSMIT state or a RECEIVE state based on a non-deterministic function. In the RECEIVE state, the node transmits an RTR beacon indicating that it is ready to receive data, and receives data from a second node. In the TRANSMIT state, the node waits for an RTR beacon from another node, determines whether any other node is currently transmitting data, and if no other node is currently transmitting data, it transmits data to sender of the RTR beacon. If another node is currently transmitting data, the first node delays transmission until the channel is free.

Additional features are described below.

DETAILED DESCRIPTION OF ILLUSTRATIVE EMBODIMENTS

In the following sections, an overview of an illustrative embodiment of an EHSN in accordance with the present disclosure is provided first. Next is a more detailed description of various aspects of the inventive communication protocol, including a comparison with alternative approaches, an EHSN media access control (MAC) protocol, details of receiver and transmitter modes of operation, and opportunistic relaying.

Overview

This disclosure addresses an outstanding problem of scheduling and routing between energy harvesting devices, allowing such devices to be networked for large-scale deployments, airplane cabins, and factory floor applications. A wireless sensor network refers to a collection (and potentially a large collection) of low-power devices each of which is capable of measuring environmental data (e.g., temperature, pressure, health, etc.) or the presence of an event (e.g., failure, proximity, etc.) and communicating these measurements wirelessly to a central processing server. Wireless sensors enable deployments in environments where wiring is impractical, and in size, weight, and power (SWAP)-constrained environments. Currently, sensor network deployment is limited by cost and battery life, particularly in environments where replacing nodes and batteries is infeasible or impractical due to the quantity or location of sensors. To overcome these issues, researchers have looked at utilizing energy harvesting technology to generate energy for the sensor's operation.

Harvesting energy from the sun, wind, temperature gradients, or vibrations can increase the lifetime of a sensor network dramatically by providing renewable energy. However, communication protocols are needed to provide deterministic networking guarantees amidst the uncertain and variable energy replenishment processes. The multi-hop EHSN networking protocol solves the issue of enabling communication and networking between energy harvesting sensor nodes, which facilitates wide-area deployments. In these environments, single-hop, infrastructure-based communication can be infeasible due to power requirements for long-distance transmissions and multipath fading profiles. However, to enable mesh networking with energy-harvesting nodes, each transmitter needs to know that the next receiver in the chain of communication has sufficient energy resources to receive and relay a packet without relying on centralized control or global synchronization. The disclosed EHSN communication protocol solves these issues using the principles of receiver-initiated beaconing to find relays with sufficient energy for reception and retransmission, and opportunistic relaying to forward packets without relying on traditional fixed routes. This disclosure uses beacons both for the purpose of scheduling and routing.

Figure 1:
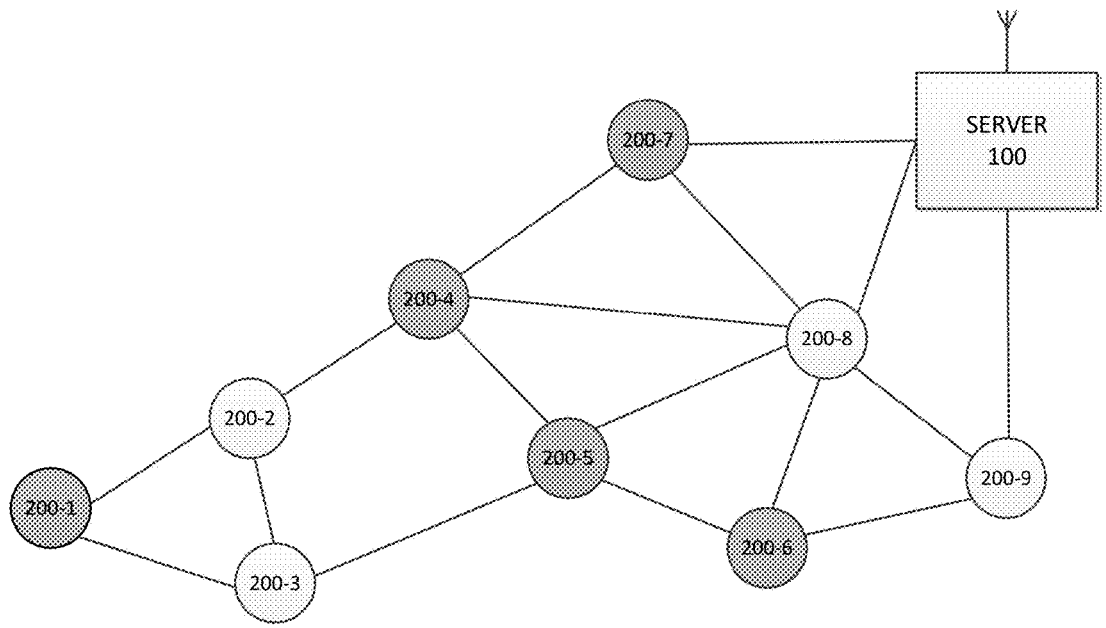
FIG. 1 schematically depicts an illustrative embodiment of a wide-area energy harvesting sensor network.

FIG. 1 schematically depicts an EHSN including a server 100 and a number of sensor nodes denoted by reference numerals 200-1 through 200-9. In the exemplary network of FIG. 1, the shaded nodes (nodes 200-1, 200-4, 200-5, 200-6, and 200-7) are assumed to have sufficient energy for transmission and reception whereas the remaining nodes (nodes 200-2, 200-3, 200-8, and 200-9) are assumed not to have sufficient energy for transmission or reception. This represents a snapshot in time of the energy state, as over time energy will be harvested and eventually nodes will have sufficient energy for communication. In this network model, the nodes are designed to convey data to the server 100. The server could be powered by battery or by an electric utility, but the nodes are powered by energy harvesting devices. The nodes transition between SLEEP and WAKE states depending on their respective energy levels. Each node requires sufficient power to transmit and receive data, and to remain idle in the WAKE state.

In one exemplary environment, the EHSN is deployed throughout an aircraft, for purposes such, e.g., as ice detection on exterior surfaces, cabin pressure measurement within the interior, proximity sensing, and engine health monitoring. Possible energy sources in such an environment include photovoltaics (solar, interior lighting, etc.), vibrational (piezoelectric), temperature gradient, air pressure, mechanical (e.g., push-button), and ambient RF energy.

The illustrative embodiment of FIG. 1 employs a new EHSN communication paradigm. Whereas the goal in a battery-powered network is to maximize lifetime (nodes are always available but need to conserve energy), the goal of the EHSN is to maximize throughput/quality-of-service subject to energy harvesting constraints. The low-energy networking protocols used for battery-powered sensor networks are not optimal for an EHSN. In an EHSN, most energy consumption is for communication purposes since transmission and reception of data require a relatively large amount of energy, and even idle listening requires energy use. When a node depletes its energy, it enters the SLEEP state and hibernates until sufficient energy has been harvested. A key challenge with an EHSN is that the energy harvesting process is uncontrollable and the timing is unknown. In other words, there is no knowledge of when a node will have harvested sufficient energy to re-enter the WAKE state. This in turn makes it difficult to provide deterministic networking guarantees.

Figure 2:
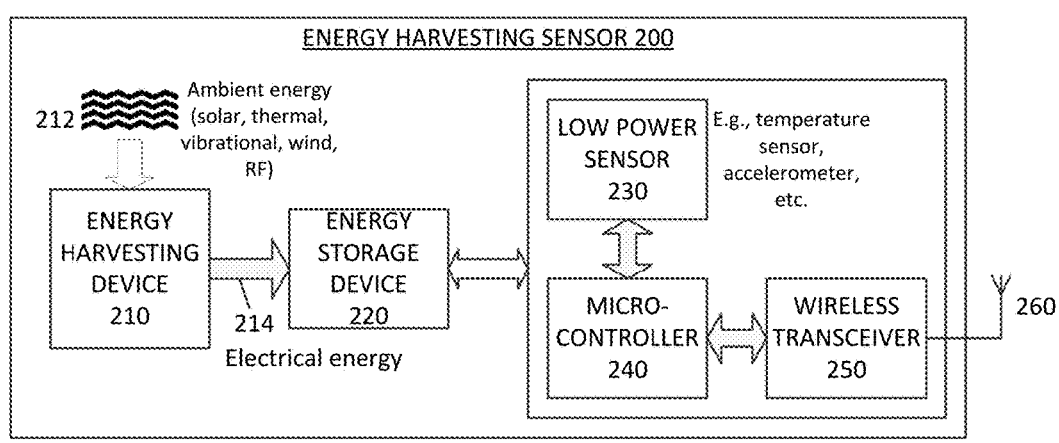
FIG. 2 schematically depicts an illustrative embodiment of an energy harvesting sensor.

FIG. 2 is a schematic or block diagram of an energy harvesting sensor 200. The energy harvesting sensor 200 includes hardware elements that are well understood by those skilled in the art. In this embodiment, the energy harvesting sensor 200 includes an energy harvesting device 210 that supplies electrical energy 214 to an energy storage device 220. The stored energy from device 220 is consumed by a low-power sensor 230, microcontroller 240, and wireless transceiver 250, which transmits and receives data via antenna 260. As indicated by reference 212, ambient energy in the form of solar, thermal, vibrational, wind, RF, etc., is harvested by device 210.

Comparison with Alternative Approaches

This disclosure addresses an outstanding problem of scheduling and routing between energy harvesting devices. Currently available routing and scheduling solutions fail to meet the desired operational requirement of supporting multi-hop deployments of energy harvesting sensors. For the scheduling subproblem, typical sensor network deployments rely on an implementation of a standard by the Institute of Electrical and Electronics Engineers (IEEE) called IEEE 802.15.4, which is based on the carrier sense multiple access (CSMA) scheme. However, CSMA is ill-suited for multi-hop energy harvesting networks for several reasons. First, to enable low-energy operations, nodes are synchronized to a global clock to ensure all nodes are awake during the same time period for transmission. Without this global synchronization, nodes transmit packets without knowledge that receivers have sufficient energy to receive packets. Second, 802.15.4 control packets, such as request-to-send (RTS) and clear-to-send (CTS), no longer solve multiple access problems such as the "hidden terminal problem" when network nodes may be hibernating to harvest energy. This disclosure's inventive approach solves these issues by configuring receivers to send beacons upon harvesting sufficient energy, allowing transmitters to learn about feasible relays with minimal overhead.

Bluetooth Low Energy (BLE) is an alternative MAC layer geared toward low-powered Internet of Things (IoT) deployments. However, Bluetooth protocols establish "master-slave" relationships between devices and lack the flexibility of a mesh deployment. In a mesh solution, when some nodes have insufficient energy to forward data, other nodes can be used instead to reduce packet delay.

The routing subproblem is traditionally solved through either proactive routing protocols (e.g., Open Shortest Path First (OSPF) or Optimized Link State Routing (OLSR)) or reactive routing protocols (Ad-hoc On-demand Distance Vector (AODV) or Dynamic Source Routing (DSR)). These protocols establish fixed routes between each sensor and the server, and forward packets along those routes. However, when an intermediate relay runs out of energy, packets must wait for the harvesting process before traversing the network. Our solution uses opportunistic forwarding, which chooses a relay on a packet-by-packet basis based on which nodes have sufficient energy. This enables energy usage to be distributed across the network allowing the EHSN to meet application performance requirements under restrictive energy harvesting constraints.

EHSN MAC Protocol

This section details the specifics of a proposed EHSN-MAC protocol. EHSN-MAC is designed for energy harvesting (EH) node-to-EH node communication as well as EH node-to-powered node communication. To facilitate communication with energy harvesting receivers, EHSN-MAC uses receiver-initiated beaconing in which receivers are responsible for beaconing to alert neighbors that they are in the active (or WAKE) state. This has the dual effect of spreading the overhead evenly between transmitters and receivers, and providing information for the transmitters to make routing and forwarding decisions.

Figure 3:
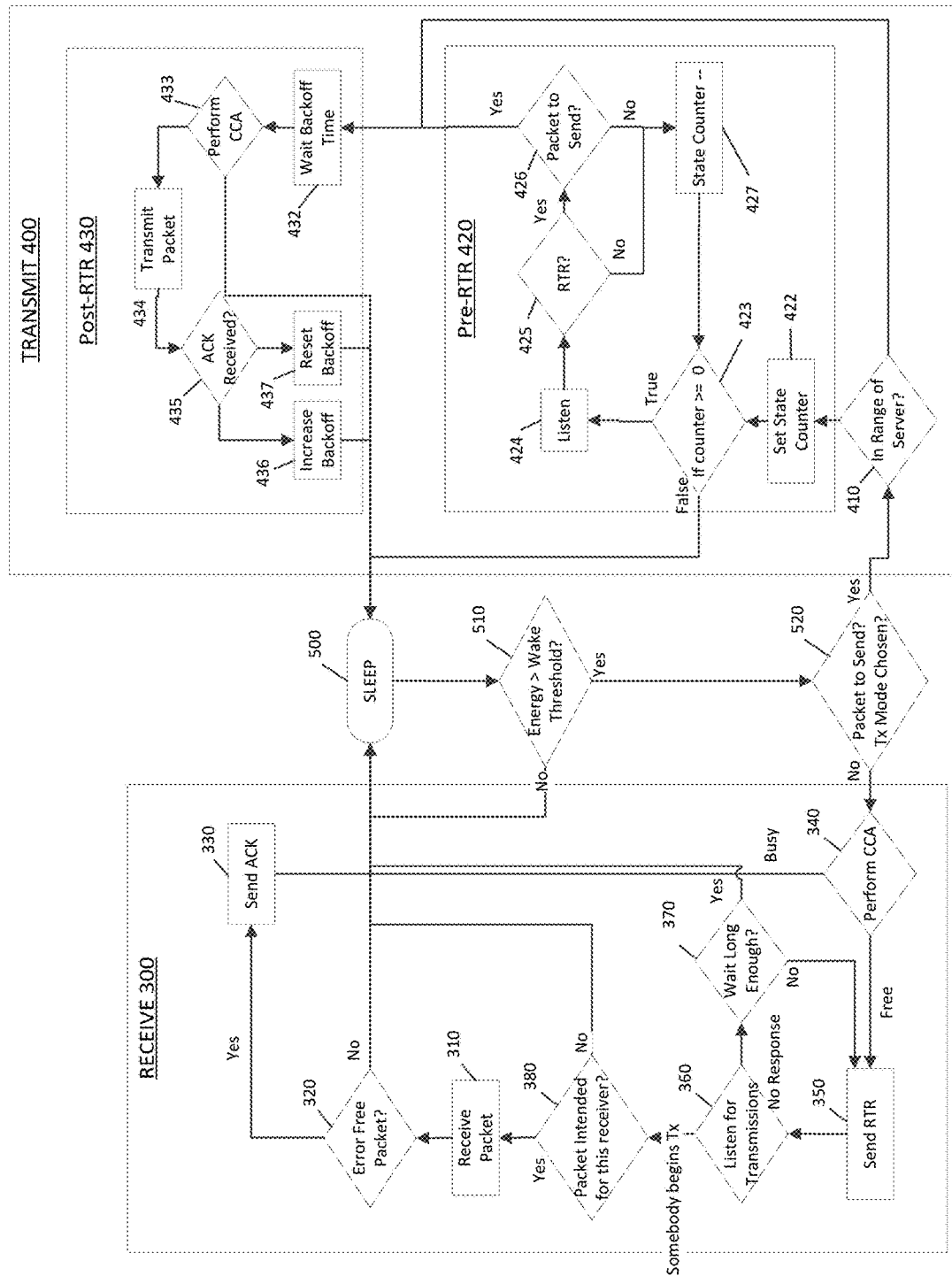
FIG. 3 is a flow diagram of the inventive EHSN communication protocol.

An overview of the protocol is shown in the flow chart of FIG. 3. The flowchart of FIG. 3 represents the operation of a sensor, or node, in each of the RECEIVE, TRANSMIT, and SLEEP states. Typically, the nodes will be configured to operate in this way via software. Thus, it will be understood by those skilled in the art that program code can be written so as to configure each node to operate according to the flowchart.

As shown, in accordance with the EHSN-MAC protocol, the nodes operate in a RECEIVE state 300, TRANSMIT state 400, or SLEEP state 500. Nodes enter the SLEEP state 500 to harvest sufficient energy for communication. Nodes will remain in this state until enough energy has been harvested, as determined by a wakeup threshold on the battery level. In FIG. 3, this is indicated at reference numeral 510. Upon waking as indicated at 520, nodes will either enter the RECEIVE state 300 or the TRANSMIT state 400, which is determined by a (potentially non-deterministic) function of backlog. (Any function for choosing Transmit or Receive could be used. For example, the function could be random as in flipping a coin, or could be "enter Transmit state if the backlog is greater than a threshold".) The operation of the nodes in the RECEIVE and TRANSMIT states is explained below.

RECEIVE State 300

As can be seen, the RECEIVE state 300 comprises a number of iterative constructs (branching or looping) represented by diamond-shaped blocks including blocks 320, 340, 370, 360, and 380. Each of these diamond-shaped blocks implements a branching or looping function, as will be apparent to those skilled in the art. In addition, the RECEIVE state 300 includes rectangle-shaped blocks 310, 330, and 350. These blocks perform a specific function and then proceed to the next block in the flowchart.

A node in RECEIVE state 300 is responsible for sending out a beacon to alert its neighbors that it has entered an active state, and then listening for a neighboring transmitter to begin transmission of a packet. The beacon sent by the receiver is a Ready-To-Receive (RTR) message 350. This packet is a short packet containing the address of the receiver. Optional extensions include adding information relating to queue length or battery state. Upon waking into the RECEIVE state 300, the node performs a clear channel assessment (CCA) 340 prior to sending out the RTR, to avoid collisions with ongoing packet transmissions. If the medium is clear, the node sends the RTR beacon 350, and enters a listening state 360. The listening state lasts either until a packet transmission is detected 380, or until enough time has elapsed 370, given by the maximum back-off interval of a transmitter. This guarantees that if a transmitter detects the RTR, it had enough time to reply to it. Upon detection of a packet, the node receives the packet 310 and sends an acknowledgement (ACK) 330 if it was received correctly 320 and it was intended for that receiver.

TRANSMIT State 400

The TRANSMIT state 400 includes a number of diamond-shaped iterative constructs (branching or looping) as well as a number of rectangle-shaped functions that take a specific action and then proceed to the next block. The TRANSMIT state 400 includes a pre-RTR state 420 and a post-RTR state 430. The decision block 410 determines whether the node is in range of the server and branches to either the pre-RTR state 420 or the post-RTR state 430. If the node is in range of the server 100 (FIG. 1), then it does not need to enter the pre-RTR state 420 and instead proceeds from block 410 directly to the post-RTR state 430 and block 432. On the other hand, if the node is not in range of the server, then it proceeds from block 410 to the pre-RTR state 420 at block 422. In addition to block 410, the TRANSMIT state 400 includes iterative blocks 423, 425, 426, 433, and 435, as well as functional blocks 422, 424, 427, 432, 434, 436, and 437.

In the TRANSMIT state 400, the node waits until it detects that a neighboring node is awake, and attempts to forward a packet to that node. Upon waking, the node enters a low power listening state 424, and waits for an RTR beacon sent by a receiver, as indicated at reference numeral 425. Upon receiving an RTR beacon, if the transmitter has a packet to send to that receiver (reference numeral 426), as determined through the opportunistic relaying scheme described below, the transmitter waits a number of slots equal to its backoff counter (reference numeral 432), performs a CCA 433, and then sends the packet 434 if the channel is idle. Upon a successful transmission, determined by the reception of an acknowledge signal (ACK) immediately after transmission (reference numeral 435), the transmitter resets the backoff exponent and the backoff counter. If no ACK is received, the backoff exponent is increased, and the backoff counter is reset (reference numeral 436). EHSN-MAC uses a similar exponential backoff procedure as CSMA/CA (CSMA with Collision Avoidance). The backoff procedure is intended to solve contention amongst transmitters when an RTR is broadcasted and multiple transmitters have packets to send. By increasing the backoff exponent upon collisions, the backoff counter adapts to the number of nodes currently contending for the channel. However, using the CSMA backoff procedure without RTR beaconing leads to a starvation of sensors far from the server.

Figure 4:
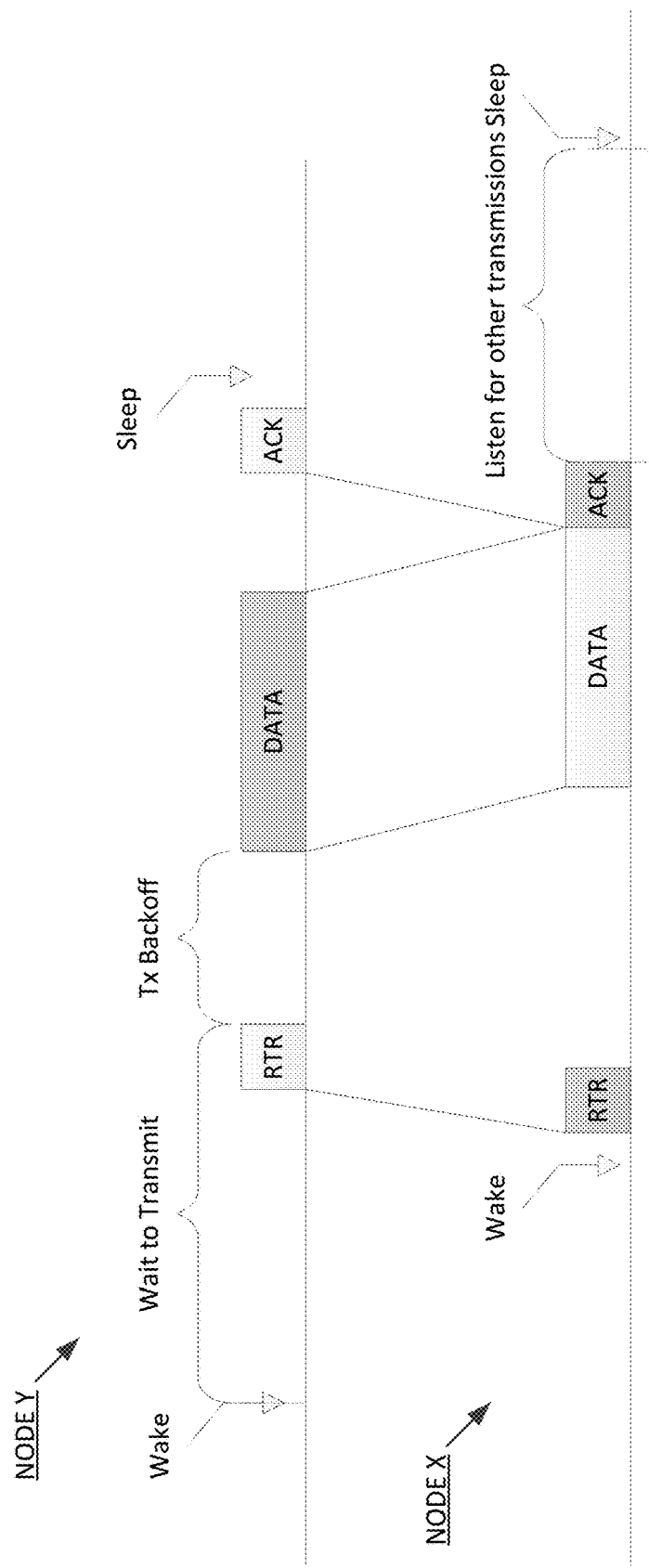
FIG. 4 is an example timing diagram for two nodes.

FIG. 4 is an example timing diagram for two nodes. In this example, shaded boxes refer to transmissions and unshaded boxes refer to receptions. Assume that we have two nodes, node X and node Y. The bottom timeline corresponds to node X and the top timeline corresponds to node Y. The first thing to happen is that node Y wakes up, and this is followed by node X waking up and transmitting an RTR beacon. The RTR beacon from node X is received by node Y, and then node Y transmits a data packet. As shown, node Y delayed its transmission by the predefined transmit backoff time. The data packet from node Y is received by node X and then node X transmits an acknowledgment (ACK) signal. After receiving the ACK signal, node Y goes back to sleep. Node X listens for other transmissions before going back to sleep, as shown.

Opportunistic Relaying Protocol

In multi-hop topologies, a routing protocol is required to address EHSN-specific challenges. Traditionally, packets are routed through a topology by calculating the shortest or least-cost fixed path between each source and destination. While shortest-path routing has been proposed for powered networks, in the sensor network environment, any fixed-path routing algorithm suffers from poor performance, because the energy resources are depleted over the planned route, while the rest of the network contains unused resources.

The inventive opportunistic relaying protocol works by opportunistically selecting a next-hop neighbor based on which neighbor has sufficient energy to receive a packet. As part of the EHSN MAC protocol, neighboring nodes send an RTR beacon when they wake from a SLEEP state. When a node receives the RTR beacon from a neighbor, it determines if forwarding a packet to that neighbor would move the packet physically closer to the destination. To utilize the protocol, it is assumed that each node is aware of the physical topology of the sensor network, a reasonable assumption when considering a static network deployment. Thus, based on the received RTR beacons, a node forwards a packet to the first node to send an RTR that is closer to the destination. This opportunistic relay selection prevents a node for waiting on a sleeping relay, while not requiring any overhead on top of the beaconing process of the EHSN MAC protocol. By opportunistically selecting the relay, less time is required to find a non-sleeping node to which to transmit.

The opportunistic relaying protocol assumes a fixed transmission power, chosen according to a power analysis. If a node is in transmission range of the server, it should forward packets directly to the server, since power cannot be reduced by sending to an additional relay. However, the fixed transmission range should be selected to maximize the performance. Additionally, nodes transmit/relay packets in the order in which they are generated, rather than the standard first-in-first-out (FIFO) order at each queue. This allows for nodes far from the server to maintain a fair allocation of networking resources. For measurement applications, additional queueing mechanisms can be implemented to drop older measurements in favor of fresh measurements.

CONCLUSION

The EHSN communication protocol described herein can provide significant value in many domains. Sensing and health monitoring are critical components of aircraft and factory operations and efficiency. EHSN networking technology enables a larger application domain for sensor deployments, and provides positive value as follows.

The EHSN networking technology provides a cost reduction through simplification of sensor complexity: Sensor systems no longer require power sources, which have considerations for cost, maintenance, spares, safety, etc. Power is a significant system operational and lifecycle element and logistics item that needs to be addressed. Not so with EHSN implementations.

Also, the EHSN networking technology provides Sensor Deployment Scale through reduced SWAP: Existing sensor platforms are generally maxed out in terms of Size, Weight, and Power, and any SWAP savings are a big value discriminator because it creates opportunities for additional capabilities to be deployed if needed.

Further, the EHSN networking technology provides Mission Endurance: Nowadays, depleted power to sensors equates to no mission capability. The ability to operate and perform the mission in austere environments (e.g., no power) is another significant value discriminator. For example, soldiers may be equipped with sensors and a typical carry kit (including all their equipment) would be on the order of 100 to 120 lbs., a significant portion of which include battery packs. EHSN technology could be used to reduce this battery requirement.

Different examples of the apparatuses and methods disclosed herein include a variety of components, features, and functionalities. It should be understood that the various examples of the apparatuses and methods disclosed herein may include any of the components, features, and functionalities of any of the other examples of the apparatuses and methods disclosed herein in any combination, and all of such possibilities are intended to be within the spirit and scope of the present disclosure. Moreover, many modifications of the examples set forth herein will come to mind to one skilled in the art to which the present disclosure pertains having the benefit of the teachings presented in the foregoing descriptions and the associated drawings. Therefore, it is to be understood that the present disclosure is not to be limited to the specific examples presented and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

I claim:

1. An energy harvesting sensor network, comprising:
a plurality of energy harvesting sensors operating as nodes, wherein each of said energy harvesting sensors is configured to operate in accordance with a predefined communication protocol; and
a server configured to wirelessly communicate with the energy harvesting sensors;
wherein the predefined communication protocol includes a RECEIVE state entered upon a node determining that the node has sufficient energy to receive a data packet and retransmit the data packet;
wherein upon entering the RECEIVE state, the node transmits a ready to receive (RTR) beacon indicating to other nodes that the node is awake, has transitioned from a SLEEP state to the RECEIVE state and is ready and has sufficient power to receive the data packet and retransmit the data packet and the node retransmits the data packet to another node that is physically closer to a destination of the data packet and is a temporally first node of the nodes to transmit another RTR beacon after the node transmits the RTR beacon.

2. The energy harvesting sensor network of claim 1, wherein the predefined communication protocol further includes a TRANSMIT state.

3. The energy harvesting sensor network of claim 2, wherein an energy harvesting sensor of the plurality of energy harvesting sensors remains in the SLEEP state until the energy harvesting sensor has harvested a predetermined threshold of energy.

4. The energy harvesting sensor network of claim 3, wherein, upon harvesting the predetermined threshold of energy, the energy harvesting sensor enters one of the TRANSMIT state or the RECEIVE state based on a non-deterministic function of a local network state.

5. The energy harvesting sensor network of claim 4, wherein the non-deterministic function determines a mode of operation based on a channel state, a traffic backlog, a local topology, or energy characteristics.

6. The energy harvesting sensor network of claim 4, wherein the energy harvesting sensor, while in the RECEIVE state, broadcasts an RTR beacon to a plurality of sensors indicating that the energy harvesting sensor is ready to receive the data packet; and upon receiving data from another sensor, queues this data for transmission toward the server.

7. The energy harvesting sensor network of claim 6, wherein the energy harvesting sensor, while in the TRANSMIT state, waits to receive an RTR beacon from a potential relay node, wherein potential relay nodes are determined by an opportunistic routing scheme;
   if the energy harvesting sensor does not detect any transmissions, the energy harvesting sensor transmits the data packet to the relay node as determined by the opportunistic routing scheme; and
   if the energy harvesting sensor detects another transmission, the energy harvesting sensor delays transmission until currently active transmissions have completed.

8. The energy harvesting sensor network of claim 2, wherein each node routes packets using one or more received RTR beacons.

9. The energy harvesting sensor network of claim 2, wherein the predefined communication protocol comprises a media access control (MAC) protocol.

10. The energy harvesting sensor network of claim 1, wherein the node determines that the node has sufficient energy to receive and transmit the data packet based upon a wakeup threshold on a level of a battery.

11. An energy harvesting node, comprising:
   an energy harvesting device;
   an energy storage device coupled to the energy harvesting device;
   a microcontroller; and
   a wireless transceiver coupled to the microcontroller,
   wherein the microcontroller and wireless transceiver are powered by the energy storage device; and
   wherein the microcontroller is configured to;
      operate the energy harvesting node in accordance with a predefined communication protocol in which the transceiver transmits a ready to receive (RTR) beacon indicating that the energy harvesting node is awake upon the energy harvesting node upon determining that the energy harvesting node has sufficient energy to receive a data packet from another energy harvesting node of a plurality of energy harvesting nodes and to retransmit the data packet; and
      retransmit the data packet to a further node of the plurality of nodes that is physically closer to a destination of the data packet and is a temporally first node of the plurality of nodes to transmit another RTR beacon after the transceiver transmits the RTR beacon.

12. The energy harvesting node of claim 11, wherein the predefined communication protocol further includes a SLEEP state and a TRANSMIT state.

13. The energy harvesting node of claim 12, wherein the energy harvesting node is configured to remain in the SLEEP state until a predetermined threshold of energy has been harvested.

14. The energy harvesting node of claim 13, wherein, upon harvesting the predetermined threshold of energy, the energy harvesting node enters one of the TRANSMIT state or a RECEIVE state based on a non-deterministic function of a local network state.

15. The energy harvesting node of claim 14, wherein the non-deterministic function comprises one or more of a channel state, traffic backlog, local topology, or energy characteristics.

16. The energy harvesting node of claim 14, wherein the energy harvesting node in the RECEIVE state broadcasts an RTR beacon to a plurality of sensors indicating that the energy harvesting node is ready to receive the data packet; and upon receiving data from another sensor, queues this data for transmission toward a server.

17. The energy harvesting node of claim 16, wherein the energy harvesting node, while in the TRANSMIT state, waits to receive an RTR beacon from a potential relay node determined by an opportunistic routing scheme;
   if the energy harvesting node does not detect any transmissions, the energy harvesting node transmits the data packet to the relay node as determined by the opportunistic routing scheme; and
   if the energy harvesting node detects another transmission, the energy harvesting sensor delays transmission until currently active transmissions have completed.

18. The energy harvesting node of claim 12, wherein the energy harvesting node routes packets using one or more received RTR beacons to infer information about an energy status of neighboring nodes.

19. The energy harvesting node of claim 12, wherein the predefined communication protocol comprises a media access control (MAC) protocol.

20. The energy harvesting node of claim 11, further comprising a sensor.

21. In a network comprising a server and plurality of nodes including an energy harvesting node, a method of wireless communication employed by the energy harvesting node, comprising:
   remaining in a SLEEP state until the energy harvesting node has determined a predetermined threshold of energy has been harvested;
   upon harvesting the predetermined threshold of energy, entering a TRANSMIT state or a RECEIVE state based on a non-deterministic function;
   in the RECEIVE state,
      transmitting a ready-to-receive (RTR) beacon indicating that the energy harvesting node has harvested the predetermined threshold of energy and is ready to receive data; and
      receiving the data from a second node of the plurality of nodes;
   in the TRANSMIT state:
      receiving an RTR beacon from a second node of the plurality of nodes;
      transmitting the data to the second node if no node of the plurality of nodes is transmitting; and
      performing a backoff mechanism if any node of the plurality of nodes is transmitting to delay transmitting the data to the second node until a channel is free;
   wherein the energy harvesting node retransmits the data to another of the plurality of nodes that is physically closer to a destination of the data and is a temporally first node of the plurality of nodes to transmit another RTR beacon after the energy harvesting node transmits the RTR beacon.

* * * * *